(12) United States Patent
Anderson et al.

(10) Patent No.: US 10,607,217 B2
(45) Date of Patent: *Mar. 31, 2020

(54) SYSTEM AND METHOD OF PROVIDING TOKENIZATION AS A SERVICE

(71) Applicant: Visa International Service Association, San Francisco, CA (US)

(72) Inventors: Lisa Anderson, San Francisco, CA (US); Seamus Cushley, Londonderry (IE)

(73) Assignee: Visa International Service Association, San Francisco, CA (US)

( * ) Notice: Subject to any disclaimer, the term of this patent is extended or adjusted under 35 U.S.C. 154(b) by 372 days.

This patent is subject to a terminal disclaimer.

(21) Appl. No.: 15/703,819

(22) Filed: Sep. 13, 2017

(65) Prior Publication Data

US 2018/0005228 A1 Jan. 4, 2018

Related U.S. Application Data

(63) Continuation of application No. 13/751,523, filed on Jan. 28, 2013, now Pat. No. 9,830,595.

(Continued)

(51) Int. Cl.
*G06Q 20/38* (2012.01)
*G06Q 20/12* (2012.01)
(Continued)

(52) U.S. Cl.
CPC .......... *G06Q 20/385* (2013.01); *G06Q 20/12* (2013.01); *G06Q 20/20* (2013.01); *G06Q 20/26* (2013.01);
(Continued)

(58) Field of Classification Search
CPC ...................... G06Q 20/383; G06Q 20/385
See application file for complete search history.

(56) References Cited

U.S. PATENT DOCUMENTS

| 5,613,012 A | 3/1997 | Hoffman |
| 5,781,438 A | 7/1998 | Lee |

(Continued)

FOREIGN PATENT DOCUMENTS

| EP | 2156397 A1 | 2/2010 |
| KR | 10-2006-0018792 A | 3/2006 |

(Continued)

OTHER PUBLICATIONS

Chipman, et al., U.S. Appl. No. 15/265,282 (Unpublished), Self-Cleaning Token Vault, filed Sep. 14, 2016.

(Continued)

*Primary Examiner* — Steven S Kim
(74) *Attorney, Agent, or Firm* — Kilpatrick Townsend & Stockton LLP

(57) ABSTRACT

Systems, devices, apparatuses, and methods for providing tokenization as a service are provided. Embodiments of the invention involve decoupling "tokenization service" from other services offered by a merchant service provider, and offering the tokenization service as a stand alone service. In accordance with an embodiment, a merchant service provider can receive payment data associated with a transaction between a consumer and a first entity. The merchant service provider can generate a payment token that represents the payment data and transmit a copy of the payment token to the first entity. The first entity can then transmit the payment token and order information to a second entity specified in the transaction. The merchant service provider can subsequently receive a request to complete the transaction from the second entity. The request can include the copy of the payment token from the second entity.

14 Claims, 10 Drawing Sheets

Related U.S. Application Data

(60) Provisional application No. 61/591,224, filed on Jan. 26, 2012.

(51) Int. Cl.
  *G06Q 20/20* (2012.01)
  *G06Q 20/26* (2012.01)
(52) U.S. Cl.
  CPC ....... *G06Q 20/383* (2013.01); *G06Q 20/3821* (2013.01); *G06Q 20/38215* (2013.01)

(56) References Cited

U.S. PATENT DOCUMENTS

| | | |
|---|---|---|
| 5,826,245 A | 10/1998 | Sandberg-Diment |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,609,654 B1 | 8/2003 | Anderson |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,197,475 B1 | 3/2007 | Lorenzen et al. |
| 7,209,561 B1 | 4/2007 | Shankar et al. |
| 7,249,099 B2 | 7/2007 | Ling |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |

(56) References Cited

U.S. PATENT DOCUMENTS

| | | |
|---|---|---|
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,704,155 B2 * | 7/2017 | McCullagh .......... G06Q 20/363 |
| 9,830,595 B2 * | 11/2017 | Anderson .......... G06Q 20/3821 |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0156868 A1 | 7/2008 | Slen |
| 2008/0189186 A1 | 8/2008 | Choi et al. |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0132413 A1 | 5/2009 | Englebrecht |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0292619 A1 | 11/2009 | Kagan et al. |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0017413 A1 | 1/2010 | James |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |

(56) References Cited

U.S. PATENT DOCUMENTS

| | | |
|---|---|---|
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2011/0307714 A1* | 12/2011 | Comrie ............... G06F 21/6209 713/189 |
| 2012/0005038 A1 | 1/2012 | Soman |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0103548 A1 | 4/2013 | Elchner |
| 2013/0103584 A1 | 4/2013 | Eichner et al. |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |

(56) References Cited

U.S. PATENT DOCUMENTS

| | | |
|---|---|---|
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0210628 A1 | 7/2016 | McGuire |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Lopez, et al., U.S. Appl. No. 15/462,658 (Unpublished), Replacing Token on a Multi-Token User Device, filed Mar. 17, 2017.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Stubbs et al., U.S. Appl. No. 62/103,522 (unpublished), Methods and Systems for Wallet Provider Provisioning filed Jan. 14, 2015.

(56) References Cited

OTHER PUBLICATIONS

Flurscheim et al., U.S. Appl. No. 62/108,403 (unpublished), Wearables With NFC HCE filed Jan. 27, 2015.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Powell, U.S. Appl. No. 61/892,407 (unpublished), Issuer Over-the-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
International Search Report and Written Opinion, dated Jun. 18, 2013, PCT Application No. PCT/US2013/023460, 11 pages.
Notice of Allowance dated Aug. 9, 2017, U.S. Appl. No. 13/751,523, 7 pages.
Notice of Allowance dated Mar. 10, 2017, U.S. Appl. No. 13/751,523, 16 pages.
Final Rejection dated Oct. 28, 2014, U.S. Appl. No. 13/751,523, 15 pages.
Non-final Office Action dated Apr. 15, 2014, U.S. Appl. No. 13/751,523, 13 pages.
U.S. Appl. No. 15/008,388, Methods for Secure Credential Provisioning, dated Jan. 27, 2016, 90 pages.
U.S. Appl. No. 15/011,366, Token Check Offline, dated Jan. 29, 2016, 60 pages.
U.S. Appl. No. 15/019,157, Token Processing Utilizing Multiple Authorizations, dated Feb. 9, 2016, 62 pages.
U.S. Appl. No. 15/041,495, Peer Forward Authorization of Digital Requests, dated Feb. 11, 2016, 63 pages.
U.S. Appl. No. 61/926,236, Methods and Systems for Provisioning Mobile Devices With Payment Credentials and Payment Token Identifiers, dated Jan. 10, 2014, 51 pages.
White et al., "How Computers Work", Paul Boger, Illustrated by Timothy Edward Downs, Seventh Edition, Oct. 2003, 23 pages.

\* cited by examiner

SYSTEM AND METHOD OF PROVIDING TOKENIZATION AS A SERVICE

CROSS-REFERENCE TO RELATED APPLICATIONS

The present application is a continuation of U.S. patent application Ser. No. 13/751,523, filed on Jan. 28, 2013, which claims priority from and is a nonprovisional Application of U.S. Provisional Patent Application No. 61/591,224, filed on Jan. 26, 2012, titled "TOKENIZATION AS A SERVICE," by Lisa Anderson and Seamus Cushley, both of which are herein incorporated by reference in their entirety for all purposes.

BACKGROUND

Tokenization is a security (data protection) procedure by which sensitive or otherwise valuable information can be replaced with a token. For example, in payment transactions, payment account information, such as credit card or bank account numbers, may be replaced with a token by a tokenization service provider. When an online transaction is conducted with a merchant, the payment account information may be sent securely to the merchant's service provider. The service provider can securely store the payment account information and return a token to the merchant. This way, tokenization enables merchants to accept payments via payment card accounts or bank accounts without having to store, transmit or process the sensitive payment data. If the consumer conducts a subsequent transaction with the merchant, they can select tie token associated with the payment account they wish to use and complete the transaction normally. This offers the benefits to the consumer of not having to reenter payment data for each transaction, while protecting the merchant from the risk and cost of storing actual payment data for each of their customers.

Typically, transaction processing and tokenization are closely coupled services. That is, when a merchant requests a token from their service provider they typically also request that a transaction be processed by their service provider using the payment data corresponding to the token. In current systems, if a merchant were to choose to nave a customer's payment data tokenized, and then utilize a different service provider to complete the transaction, the merchant would need to obtain the actual payment data to send to the different service provider. As the merchant would now be handling the actual payment data, this would defeat many of the benefits of tokenization.

BRIEF SUMMARY

A "tokenization service" offered by a merchant service provider (e.g., CYBERSOURCE) is sometimes coupled with the merchant service provider's "payment authorization service." For example, when a merchant requests that merchant service provider run a payment authorization on a particular credit card, the merchant may also request that merchant service provider tokenize the credit card and send a copy of the resulting payment token back to the merchant. In future payment authorization requests involving the same credit card, the merchant can submit the payment token to merchant service provider instead of the actual credit card number. In many instances, the merchant cannot use the payment token for anything other than to request that the merchant service provider run a payment authorization on the underlying credit card. Thus, a merchant may not often request that the merchant service provider tokenize a credit card without also requesting that merchant service provider use the resulting payment token to run payment authorizations.

Embodiments of the invention involve decoupling the "tokenization service" from the "payment authorization service," and offering the tokenization service as a stand-alone service. By decoupling these services tokenization as a service (TaaS) enables merchants to share payment tokens.

For example, a first entity, such as are online travel agent (e.g., ORBITZ), which provides reservation services for, among other things, rental cars, uses a merchant service provider's (e.g., CYBERSOURCE) hosted payment acceptance services to collect credit card data on its behalf. Further, according to this example, the online travel agent uses the merchant service provider's tokenization service to tokenize the collected credit card data. Thus, according to this example, when a customer enters his credit card data in the online travel agent's website to pay for a rental car, the merchant service provider would collect the credit card data on travel agent's behalf, generate a payment token for the credit card, and pass the payment token back to the online travel agent.

According to some embodiments, instead of also using the merchant service provider's payment authorization service to run a payment authorization on the credit card, the online travel agent passes a copy of the token to the rental car company from which the customer is renting a car. The rental car company, according to some embodiments, can then submit a copy of the token to back to the merchant services provider and request that merchant service's provider: (1) run a payment authorization on the consumer's credit card on behalf of the rental car company to pay for the cost of the rental car (this would enable the rental car company to also avoid handling the credit card data); or (2) provide the rental car company with the corresponding credit card data so that the rental car company can run the payment authorization itself.

Embodiments of the invention are directed to methods, a computer-readable medium, servers and systems for enabling entities to transmit payment tokens, instead of actual payment data. For example, according to embodiments, a payment services server receives from a server of a first entity a consumer's payment data via a network interface. The payment services server processes the payment data to generate a payment token that represents the payment data, and transmits a copy of the resulting payment token, via a network interface, back to the server of the first entity. The server of the first entity transmits, via a network interface, a copy of the payment token to server of a second entity. The server of the second entity, via a network interface, transmits a copy of the payment token to the payment services server along with a request to: (1) provide the server of the second entity with the consumer's payment data that corresponds to the copy of the payment token: or (2) process a payment transaction on behalf of the second entity using the consumer's payment data that corresponds with the payment token. Among other benefits, embodiments of the invention not only enable the first entity to avoid handling the consumer's payment data, but embodiments also enable the first entity to avoid being the party that requested the payment transaction. Further advantages of embodiments include enabling the second entity to also avoid handing the consumer's payment data.

Other embodiments of the invention are directed to computer-readable media comprising code for performing the described methods as well as systems, apparatuses and devices that perform the methods and/or that use the computer-readable media.

These and other embodiments of the invention are described in further detail below.

DETAILED DESCRIPTION

A "hosted order page" (HOP) is a third-party hosted webpage that accept payment data from a customer on a merchant's web site. A merchant typically redirects a customer to a HOP on the third-party's domain/server when the customer selects a 'Buy' or 'Checkout' button from an online shopping cart. The third party, which is neither the merchant nor the customer, uses payment data entered by the customer in order to process a credit card transaction, etc. for the merchant so that the merchant can avoid the cost and effort of complying with the Payment Card Industry Data Security Standard (PCI DSS) and government regulations regarding storing credit card numbers.

A "silent order post" (SOP) is akin to a HOP but with only the sensitive textboxes and other input controls being hosted by the third party. That is, the merchant hosts the order page but the sensitive fields, such as the credit card number and expiration date entry textboxes, are posted only to the third party's servers.

Figure 1:
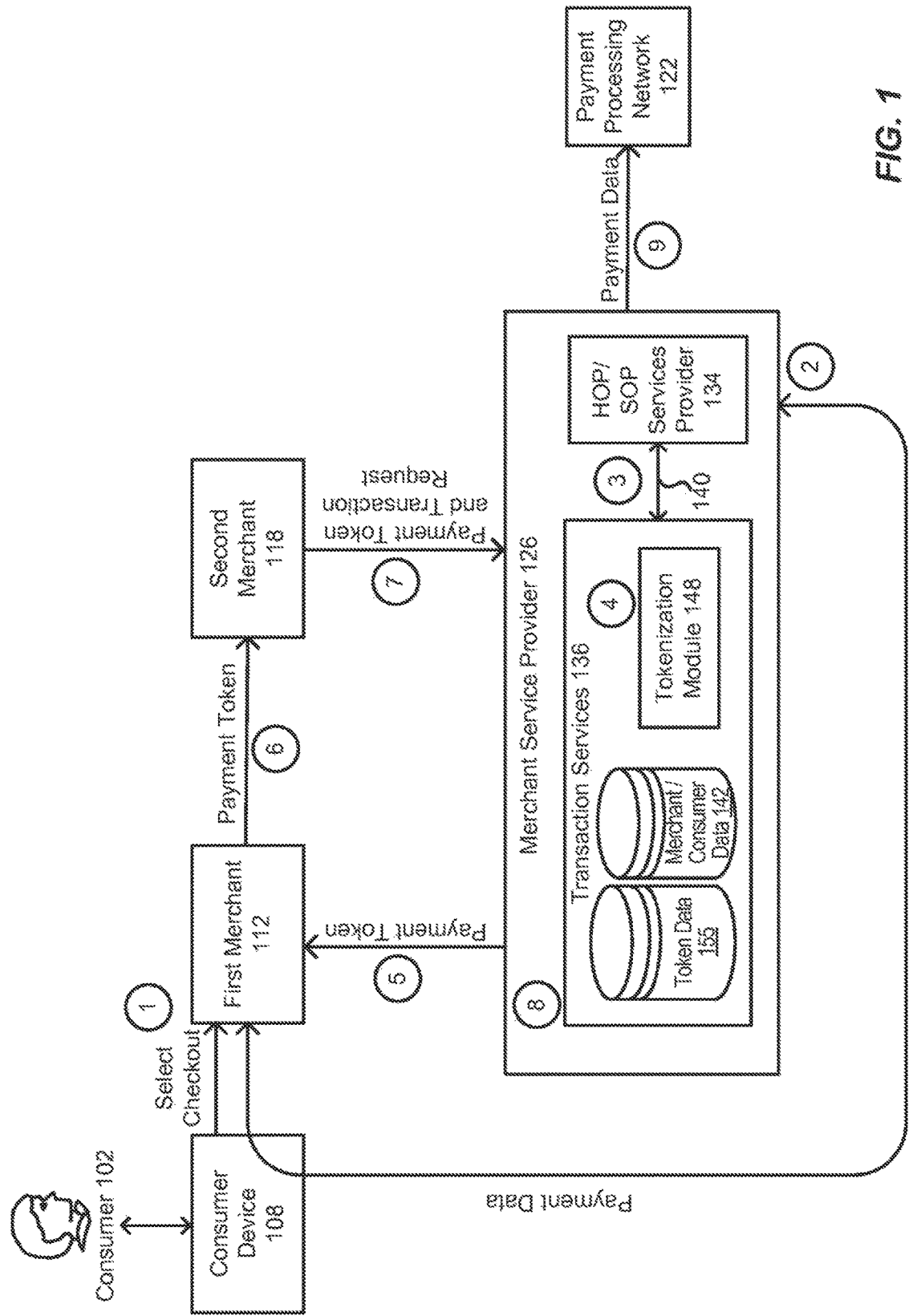
FIG. 1 is a block diagram of an example of an operating environment in which embodiments of the invention can be implemented.

FIG. 1 is a block diagram of an example of an operating system 100 in which embodiments of the invention can be implemented.

FIG. 1 depicts a consumer 102, a user device 108 associated with the consumer 102, a first merchant 112, a second merchant 118, a payment processing network 122, and a merchant service provider 126 ("service provider"), communicatively connected. The service provider 126 includes transaction services 136 and HOP/SOP services provider 134 that provides hosted payment pages and silent order posts. The transaction services 136 includes merchant/consumer profile/account data 142 and token data 155 as well as a tokenization module 148. The system 100 illustrated in FIG. 1 is referred to as a hosted service system 100, wherein the service provider 126, acting as a "host", hosts services for clients, such as the merchants 112, 118. According to the illustrated embodiment, the merchants 112, 118 and the consumer 102 can transmit information associated with electronic transactions to the service provider 126. According to some embodiments, the merchants 112, 118 may transmit information, such as order information, or a request to create an account, to tokenize payment data, and/or to process a transaction to the service provider 126, which performs one or more services based at least on the transaction information received from the merchants 112, 118.

The consumer 102 is, generally, any entity that is a purchaser of products or services via an electronic transaction. Non-limiting examples include a person or business entity that purchases, reserves, or licenses goods and/or services from ecommerce websites via the public Internet or at a retail store using a credit card, debit card, e-check, etc. The merchants 112, 118 may be, generally, any entity that offers goods or services in exchange for value.

The service provider 126 is a third party other than the consumer and merchant, that provides services in support of electronic transactions (e.g., CYBERSOURCE, AUTHORIZE.NET). Non-limiting examples of such services include services related to payment acceptance processing (e.g., HOP and SOP), credit card authorization, payment data tokenization, risk evaluation and management, fraud screening, tax calculation, export compliance verification, delivery address verification, Internet and/or e-mail address verification, payment crediting, billing, and the like. Service providers 126 may invoke service features of other service providers in support of their service offerings.

The consumer 102 and the merchants 112, 118 may communicate through a network, such as with Internet-originated transactions. As part of a purchasing process certain information is collected from the consumer 102 by the merchants 112, 118. Non-limiting examples of information collected from the consumer 102 include information about the item or service to be purchased/reserved, payment amount, shipping address, and whether the consumer wants to create an account with the merchant. However, some merchants may opt to not collect payment data, such as credit or bank card payment account numbers, and instead request that the service provider 126 collect such information on their behalf. For example, merchants may opt not to collect payment data because merchants want to avoid the costs associated with PCI compliance.

Once transaction and consumer-related information is collected by a merchant 112, 118, the merchant transmits at least a portion of the information to the service provider 126. Additional information may be transmitted along with the information described. For example, the merchant 112, 118 may transmit customized data or a specification of service provider 126 services to apply, or to ignore, in the electronic transaction processing that is provided by the service provider 126. Although not limited to any specific information, the types of information described above are referred to collectively herein as "order information." Any or all of the information referenced above, which is transmitted from the merchant 112, 118 to the service provider 126, may be transmitted through a network in any suitable protocol. An example of a suitable protocol is Secure Sockets Layer (SSL).

The service provider 126 performs one or more services in relation to the electronic commercial transaction associated with transmitted transaction information. Typically, when not implementing embodiments described herein, the service provider 126 perform services in a manner predetermined by the service provider 126. For example, specific services are performed in e specific order for specific merchants, according to a service provider default or to an agreement between the merchant and the service provider.

An example will now be provided with reference to the encircled reference numerals 1-9 provided in FIG. 1. It should be appreciated that the encircled reference numerals are provided for illustrative convenience and are not intended to limit ways in which data may flow or the order in which steps may be executed in the system 100. For example, data may flow to and from any component of the system 100 in any order.

Referring to encircled reference numeral 1 of FIG. 1, this example begins with the consumer 102 visiting the merchant webpage, which is provided by a merchant web server. While visiting the merchant page, the consumer 102 can search for and view details for items and services. For example, the first merchant 112 may be an online travel company/agency (e.g., ORBITZ, EXPEDIA, etc.) that provides reservation services for the second merchant 118, which may be a rental car company. In this example, the consumer 102 may search for and view details of rental cars, and the consumer 102 may select a "Book Now", or "Make a Reservation" button to reserve a rental car. When the consumer 102 decides on an item/service to purchase/rent/reserve, the consumer may indicate his selection by selecting the item/service, such as by selecting a "Book Now", "Reserve", "Purchase" button.

As indicated at encircled reference numeral 2 of FIG. 1, when the consumer 102 communicates his decision to the first merchant 112, such as by selecting the "Book Now" or "Reservation" or "Purchase" button on the merchant page, the merchant 112 invokes the service provider 126 to collect payment data from the consumer 102, such as via a HOP or SOP. This enables the merchant 112 to avoid handling the consumer's payment data.

For example, the first merchant 112 may utilize a HOP, which is provided by the service provider 126 to collect payment data on behalf of the merchant 112. In the event a HOP is used, the "Book Now" or "Make a Reservation" or "Purchase" button may include a URL that redirects the user device 108 to a location at the HOP services provider 134. When the redirect occurs, the order information, among other information, may optionally be transmitted via a secure connection, such as an SSL pipe, from the merchant 112 to the HOP services provider 134 by way of the redirect through the user device 108. In some examples, the order information and other information are provided to the HOP services provider 134 in an HTML post. In any event, when the redirect occurs, the HOP services provider 134 provides a hosted payment page to the consumer 102 via the consumer device 188. For example, the hosted payment page may include a summary of the order information, input fields into which users may input their credit card information, e.g., credit card type, number, expiration data, etc., and input fields into which user may input billing address information for the credit card, and a "Purchase", "Submit" etc. button that user may select to submit their payment data to the service provider 126.

In accordance with an embodiment, the merchant 112 can elect to use a SOP. When the customers selects the "Submit", "Book Now", or "Make a Reservation" button to confirm a purchase/order/reservation, a script code in the merchant's website initiates a call to the service provider to pass or 'post' the data to the service provider's system, thereby enabling the merchant 112 to avoid handling the payment data.

In some embodiments, the merchant 112 can elect to use an inline frame, which is provided by the service provider 126 to collect payment data on behalf of the merchant 112. When using an inline frame, the "Book Now" or "Make a Reservation" or similar button may direct the user to another webpage hosted by the merchant 112, where the service provider 126 provides an inline payment frame in the webpage for collecting payment data a related data, such as address information, from the consumer 102 on behalf of the merchant 112.

It should be noted that, in the illustrated example, when a HOP and/or SOP is provided, the payment data is transmitted via a secure connection, such as an SSL pipe, from the user device 108 to the service provider 126 and bypasses the merchant 112 altogether. Thus, the merchant 112 does not handle the payment data and therefore does not have to be PCI compliant.

As indicated at encircled reference numeral 3, the HOP/SOP services provider 134 sends via link 140 the payment data and other associated information (e.g., billing address information) to the transaction services 136, which according to some embodiments, accesses the merchant/consumer profile data 142 to determine whether the consumer 102 already has an account/profile stored at the merchant service provider 126. If the consumer 102 already has a profile, then the transaction services 136 updates the payment data and the billing information in the consumer's account/profile with the payment data and the billing information that the consumer inputted via the HOP/SOP. If the consumer 102 does not already have a profile, then the transection services 136 creates an account/profile for the user in the consumer/merchant profile data 142 and stores in the newly created account/profile the consumer's payment data and billing information.

Further, as indicated at encircled reference numeral 4, the transaction services 136 instructs the tokenization module 148 to tokenize the payment data inputted by the consumer 102 and thereby create a payment token for the consumer's payment data (e.g., the tokenization module 148 generates a payment token that represents the consumer's credit card). It should be appreciated that the tokenization module 148 may create a unique payment token for each payment account (e.g., for each credit card) stored in the consumer's profile. The tokenization module 148 then stores a copy of the payment token(s) in the token database 155. Further, as indicated at encircled reference numeral 5, the merchant service provider 126 sends a copy of the payment token(s) to the merchant 112, which can store the payment token(s) on its database. For example, the merchant 112 also creates an account/profile for the consumer on its database and stores the payment token(s) in the consumer's account/profile.

As indicated at encircled reference numeral 6, the first merchant 112 sends a copy of the payment token, which represents the consumer's payment data (e.g., credit card), to the second merchant 118. This may occur, for example, in an arrangement where the first merchant 112 brokers services provided by the second merchant to the consumer 108, e.g., the first merchant 112 could be an online travel agency that advertises and brokers rental cars for the second merchant 118. The second merchant 118 may store the payment token along with information about the consumer 102 in its database. Further, as indicated at reference numeral 7, to process a transaction and receive payment, the second merchant 118 sends a copy of the payment token back to the merchant service provider 126, along with a transaction request (e.g., a request to charge the consumer's payment account for the cost of a rental car).

Figure 7:
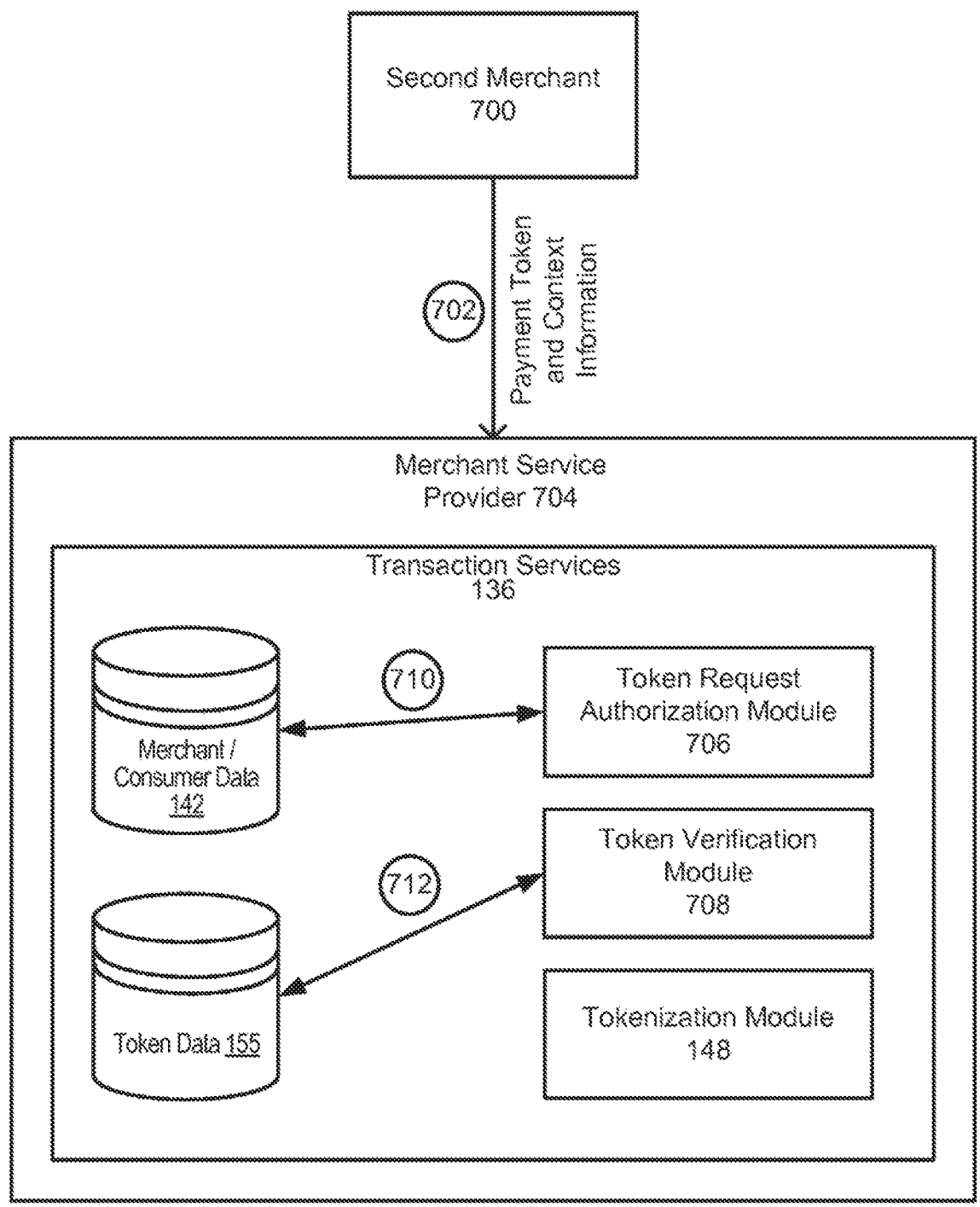
FIG. 7 is a block diagram of an exemplary system for authorizing requests using payment tokens in accordance with an embodiment.

As indicated at encircled reference numeral 8, the transaction services 136 accesses the token data 155 to obtain the actual payment data associated with the token, which was submitted by the second merchant 112. The transaction services 136 may also access the consumer/merchant data 142 to obtain additional information about the consumer 102 (e.g., billing address) and/or the second merchant 118, such as the second merchant's deposit account/acquiring bank information. As indicated at encircled reference numeral 9, to process the payment requested by the second merchant 118, the service provider 126 sends the actual payment data along with transaction data to the payment processing network 122 (e.g. VISA), which processes the payment and then sends a confirmation or denial message to the second merchant 118 or to the service provider 126, which forwards the notice to the second merchant 118. FIG. 7 illustrates an environment 10 and process by which the payment processing network, which is illustrated in FIG. 7 as an electronic transaction service provider 26, processes the transaction so as to transfer funds from the consumer's account at Issuer 38 to the second merchant's account at Acquirer 30.

Figure 2:
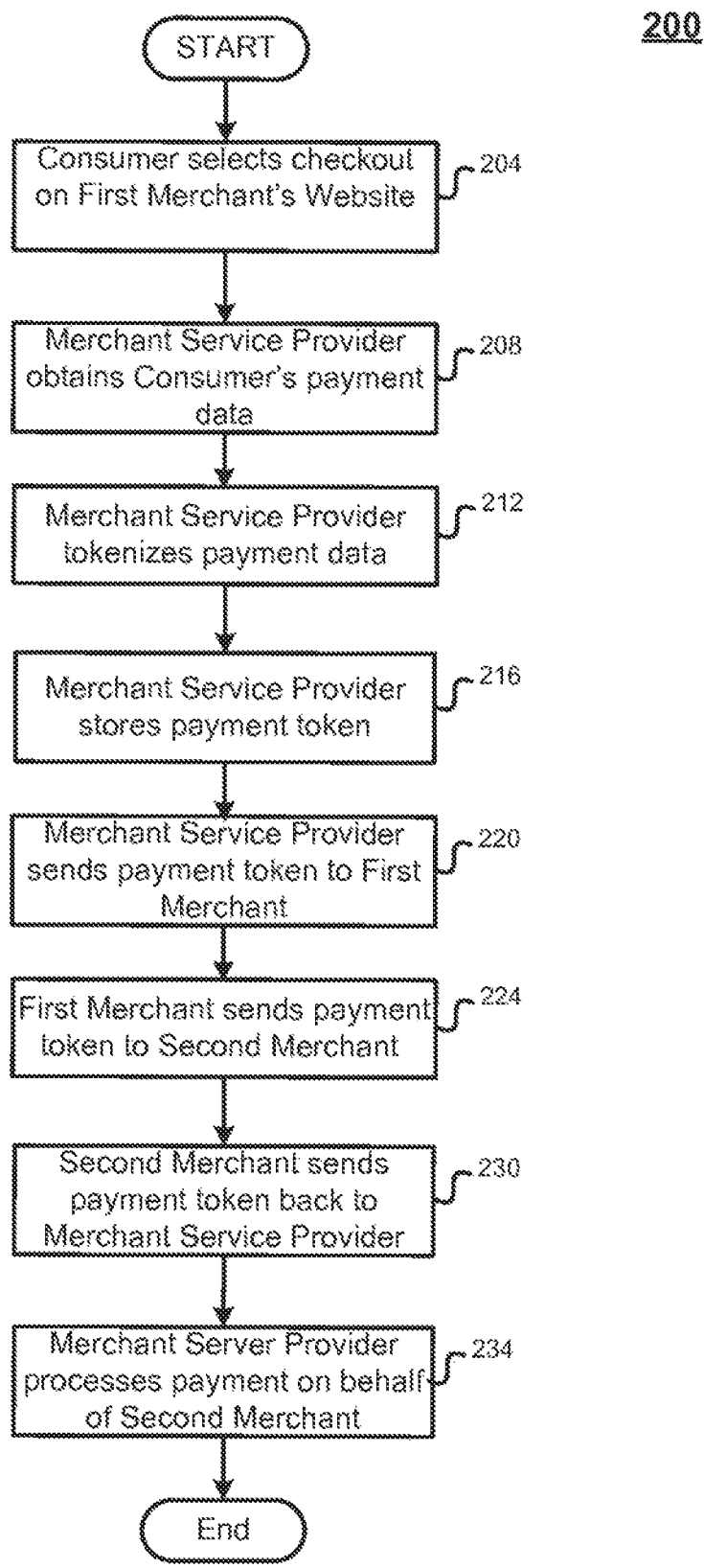
FIG. 2 provides an example process for providing tokenization as a service, according to an embodiment.

An example process 200 is provided in FIG. 2 whereby the process involves processing a payment transaction, according to an embodiment. The process 200 of FIG. 2 is described herein as being implemented by system 100 of FIG. 1. However, it should be appreciated that the process 200 may, implemented in any suitable environment. As illustrated at block 204, a consumer 102, using a consumer device 108, accesses a website provided by a first merchant 112 and selects an item service for purchase, or the consumer 102 selects to reserve the item/service, where the item/service is provided by a second merchant 118. For example, the first merchant 112 may be travel services website (e.g. an online travel agent, such as ORBITZ) and the second merchant 118 may be a rental car company. In operation, the first merchant 112 via its website may present to consumers, rental cars that are owned and operated by the rental car company, and consumers may be able to reserve the second merchant's rental cars via the first merchant's website.

In some instances, may be desirable for the first merchant 112 to avoid handling the consumer's payment data. This would enable the first merchant 112 to avoid PCI compliance, and to avoid being responsible for charging the consumer.

As illustrated at block 208, the merchant service provider 126 obtains the consumer's payment data. For example, the merchant service provider 126 collects the consumer's payment data via a SOP, and/or a HOP. Alternatively, in some embodiments, the merchant service provider 126 can collect the consumer's payment data via an inline payment frame. According to block 212, the merchant service provider 126 tokenizes the obtained payment data, and, as indicated at block 216, the merchant service provider 126 stores the resulting payment token along with additional information about the consumer (e.g., name, billing address, etc.) in the token data 155 and/or merchant/consumer data 142. As illustrated at block 220, the merchant service provider 126 sends a copy of the payment token to the first merchant 112, which, according to block 224, sends a copy of the payment token to the second merchant 118. As indicated at block 230, to use the payment token to obtain payment for a service/product that the second merchant 118 is to provide to the consumer 102, the second merchant 118 sends the payment token back to the merchant service provider 126. The merchant service provider 126, according to block 234, obtains the actual payment data associated with the token from the token data 155, and sends the token to a payment processing network for processing the payment on behalf of the second merchant 118. Thus, according to process 200, the first merchant 112 can sell/broker items/service on behalf of the second merchant 118 without having to handle actual payment data. Further, according to process 200, the second merchant 118 avoids handling payment data, too.

Figure 3:
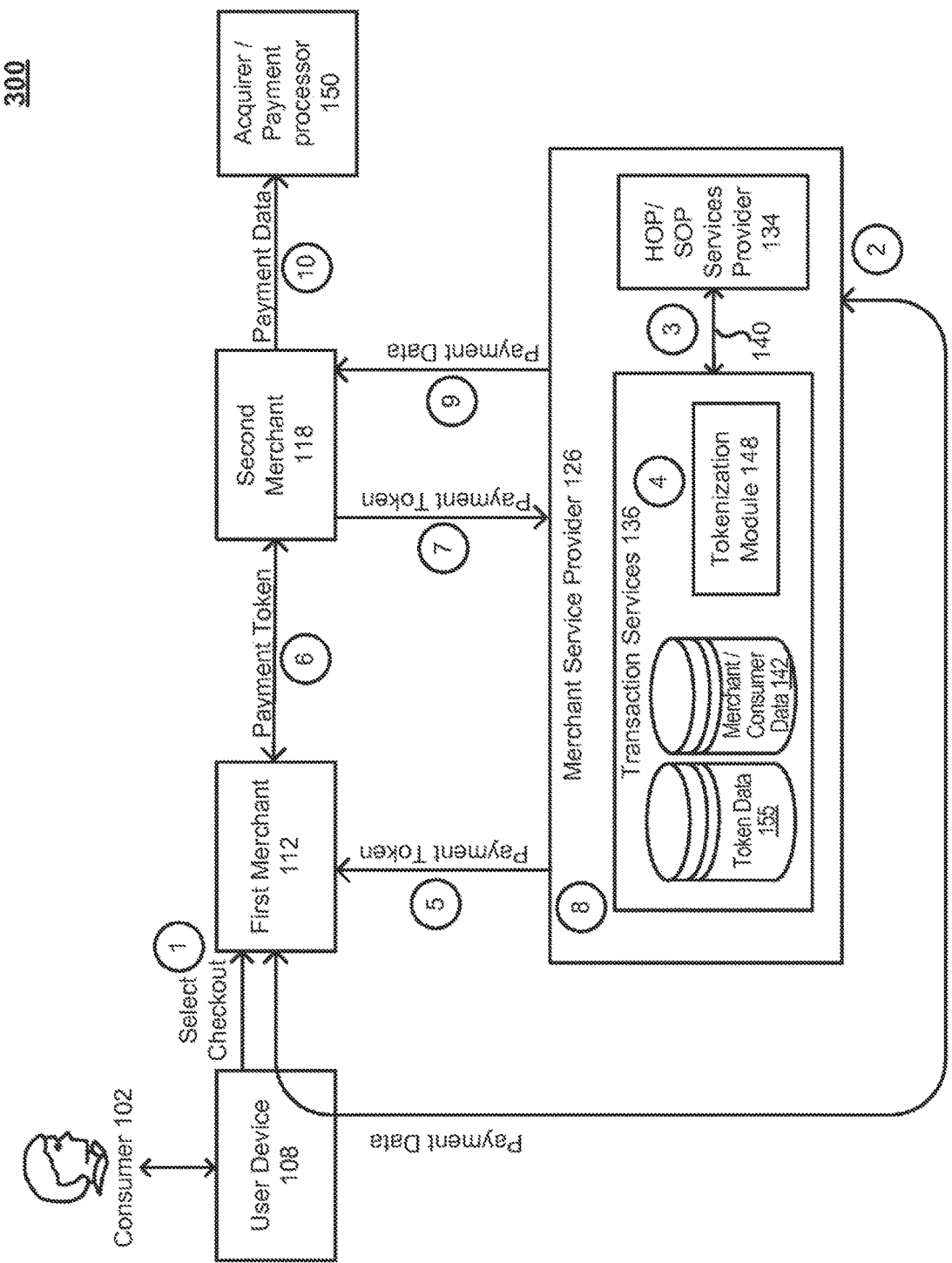
FIG. 3 is a block diagram of an example of an operating environment in which embodiments of the invention can be implemented.

FIG. 3 provides a block diagram of an operating system 300 in which embodiments of the invention can be implemented. The components of system 300 generally correspond to the components of system 100. Further, the steps illustrated by reference numerals 1-6 in FIG. 3 generally correspond to the steps illustrated by reference numerals 1-6 in FIG. 1. However, the steps illustrated by reference numerals 7-10 of FIG. 3 are not illustrated in FIG. 1.

As indicated at encircled reference numeral 7-9 of FIG. 3, instead of sending the payment token back to the merchant service provider 126 and requesting that the merchant service provider 126 use the token to obtain the consumer's actual payment data and then send the actual payment data to a payment processing network (e.g. VISA) in the form of a transaction request, the second merchant 118 sends the payment token to the merchant service provider 126 (reference numeral 7) and requests that the merchant service provider 126 use the token to obtain the consumer's actual payment data (reference number 8) and then send the actual payment data back to the second merchant 118 (reference number 9). Thus, unlike the second merchant in FIG. 1, the second merchant 118 in FIG. 3 handles the actual payment data. As indicated by reference numeral 10, upon receiving the consumer's actual payment data from the merchant service provider 126, the second merchant sends the payment data in the form of a transaction request to an Acquirer/payment processor or a merchant service provider 150 other than the merchant service provider 126.

Figure 4:
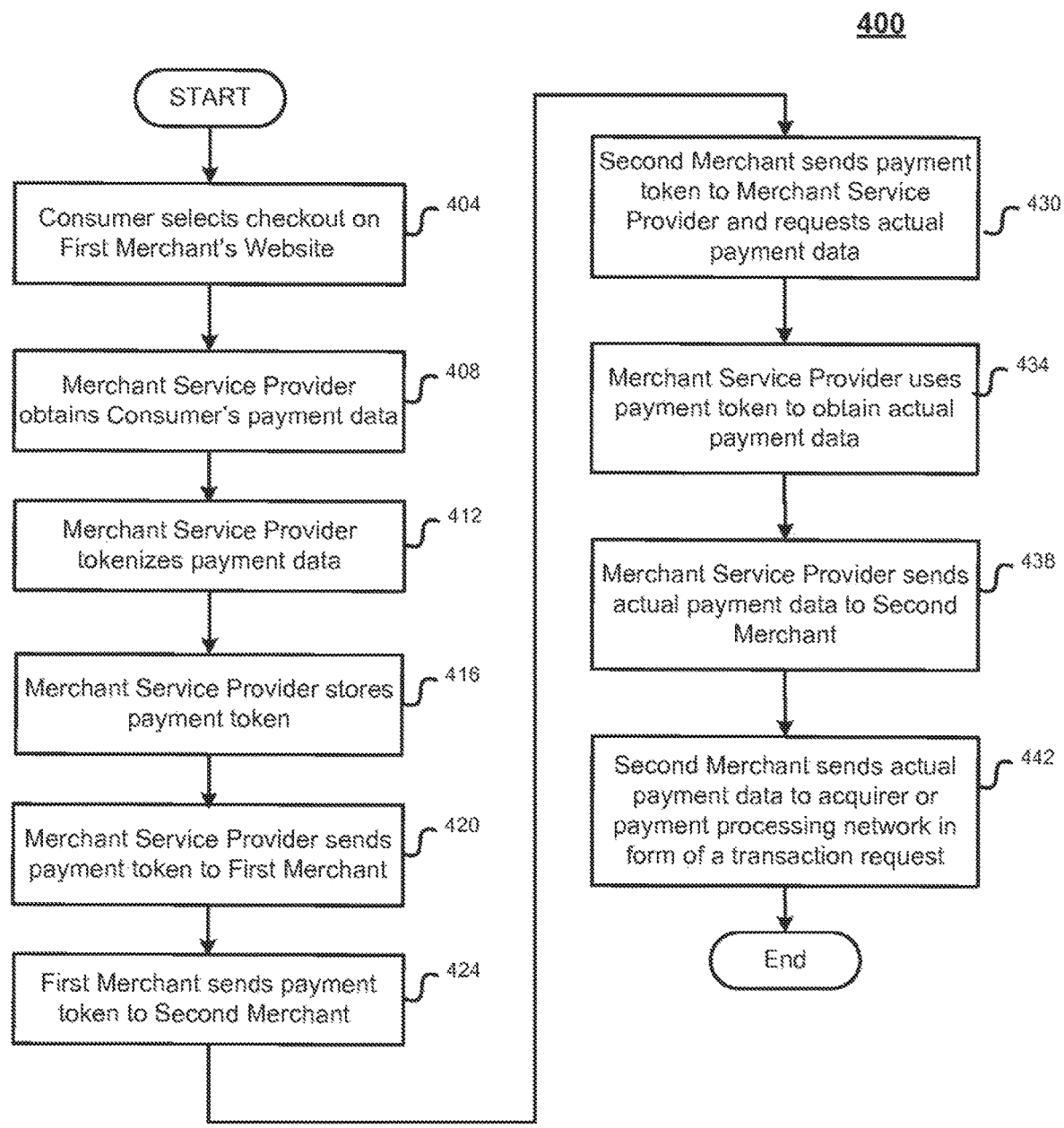
FIG. 4 provides an example process for providing tokenization as a service, according to an embodiment.

An example process 400 is provided in FIG. 4 whereby the process involves processing a payment transaction, according to an embodiment. The process 400 of FIG. 4 is described herein as being implemented by system 300 of FIG. 3. However, it should be appreciated that the process 400 may be implemented in any suitable environment. As illustrated at block 404, a consumer 102, using a consumer device 108, accesses a website provided by a first merchant 112 and selects an item/service for purchase, or the user 102 selects to reserve the item/service, where the item/service is provided by a second merchant 118. For example, the first merchant 112 may be travel services website (e.g. an online travel agent, such as ORBITZ) and the second merchant 118 may be a rental car company. In operation, the first merchant 112 via its website may present to consumers rental cars that are owned and operated by the second merchant (the rental car company). Consumers can reserve the second merchant's rental cars via the first merchant's website.

In some instances, may be desirable for the first merchant 112 to avoid handling the consumer's payment data. This would enable the first merchant 112 to avoid PCI compliance, and to avoid being responsible for charging the consumer.

As illustrated at block 408, the merchant service provider 126 obtains the consumer's payment data. For example, the merchant service provider 126 collects the consumer's payment data via a SOP, and/or a HOP. Alternatively, in some embodiments, the merchant service provider 126 can collect the consumer's payment data via an inline payment frame. According to block 412, the merchant service provider 126 tokenizes the obtained payment data, and, as indicated at block 416, the merchant service provider 126 stores the resulting payment token along with additional information about the consumer (e.g., name, billing address, etc.) in the token data 155 and/or merchant/consumer data 142. As illustrated at block 420, the merchant service provider 134 sends a copy of the payment token to the first merchant 112, which, according to block 424, sends a copy of the payment token to the second merchant 118. As indicated at block 430, to use the payment token to obtain the consumer's actual payment data, the second merchant 118 sends the payment token back to the merchant service provider 126 and requests that the merchant service provider reply with the actual payment data that corresponds with the payment token. The merchant service provider 126, according to block 434, obtains the actual payment data associated with the token from the token data 155, and, according to block 438, sends the actual payment data to the second merchant 118. The second merchant according to block 442, sends the payment data in the form of a transaction request (e.g. transaction request for payment for the rental car) to an acquirer or a payment processor 150.

Thus, according to process 400, the first merchant sell/broker items/services on behalf of the second merchant 118 without having to handle actual payment data, whereas, according to process 400, the second merchant 118 does handle payment data.

As described above, a consumer 102 can conduct a transaction with a first merchant 112 for a product or service provided by a second merchant 118. The first merchant 112 can forward a payment token to the second merchant 118 to complete the transaction, without requiring the first merchant 112 to manage actual payment data. Once the payment token is received by the second merchant 118, the second merchant 118 can request the associated payment data to complete the transaction from the merchant service provider 126. This enables the tokenization of payment data to be decoupled from the payment transaction. However, this decoupling also increases the risk of mistaken or fraudulent use of a payment token.

Figure 5:
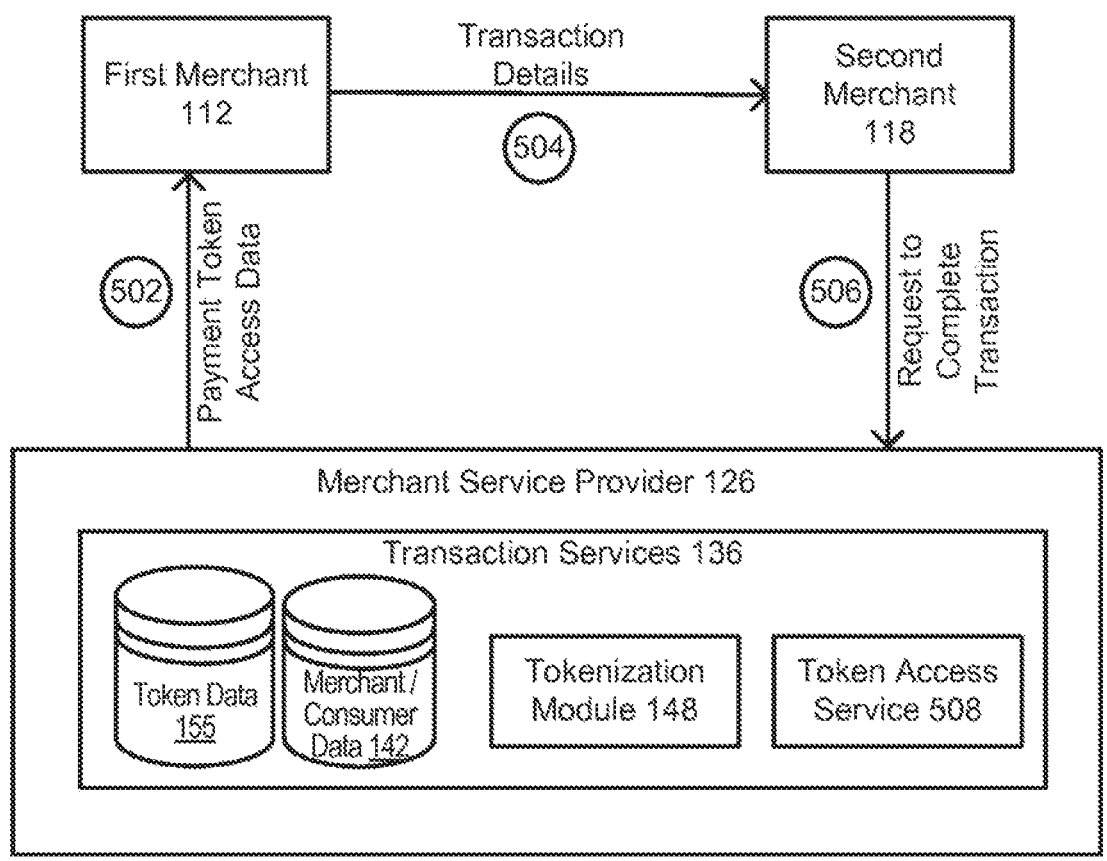
FIG. 5 is a block diagram of an exemplary system in which token access is centrally managed, in accordance with an embodiment.

FIG. 5 is a block diagram of an exemplary system 500 in which token access is centrally managed, in accordance with an embodiment. As discussed above with respect to FIGS. 1-4, the merchant service provider 126 can receive a consumer's payment data and create and store a payment token. As shown in FIG. 5, rather than sending the payment token to the first merchant 112, at 502 the merchant service provider 126 can send payment token access data to the first merchant. This access data can include a key, transaction ID, or other data which corresponds to the newly created payment token. After receiving the payment token access data, at 504 the first merchant can send transaction details to the second merchant 118. The transaction details can include the payment token access data which the second merchant 118 can use to complete the transaction. At 506, the second merchant 118 can send a request, including the payment token access data to the merchant service provider 126 to complete the transaction. A token access service 508 can receive the payment token access data and retrieve the payment token from the token data store 155. As described above, the merchant service provider 126 can complete a transaction by retrieving the actual payment data corresponding to the token and either processing the payment itself, or returning the actual payment data to the second merchant 118 for further processing. Additionally, the merchant service provider can send a copy of the payment token to the second merchant 118 to store for use in subsequent transactions with the consumer. Although in FIG. 5 the token access service 508 is provided by the merchant service provider 126, in some embodiments a token access service can be provided as a standalone service which is separate from the merchant service provider.

Figure 6:
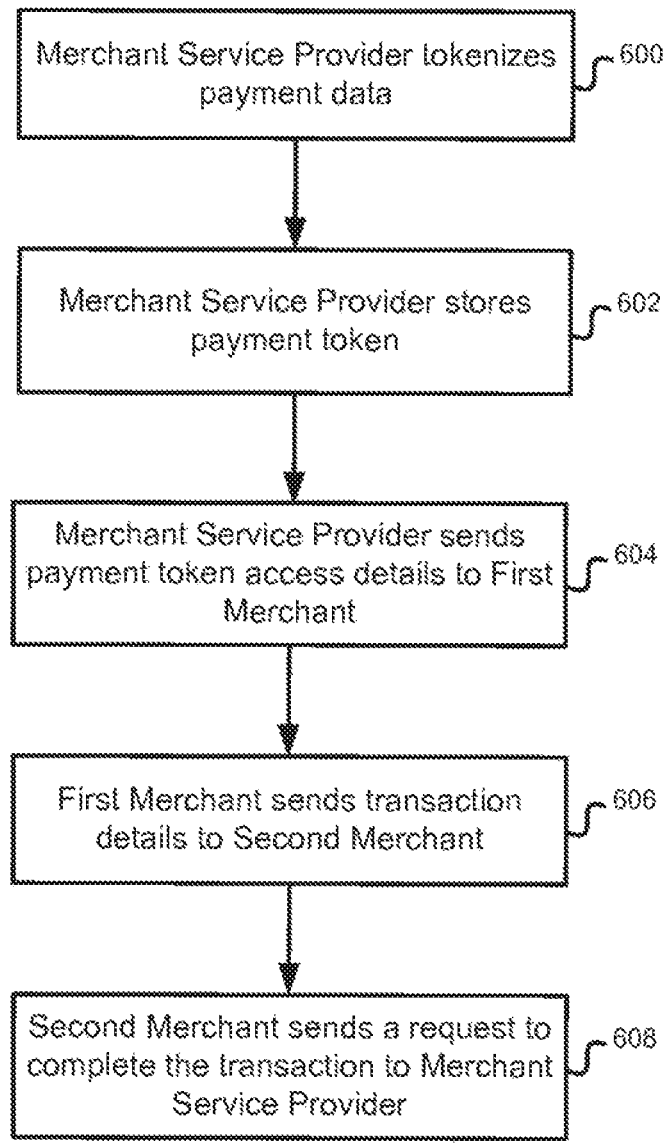
FIG. 6 provides example process for centrally managing access to payment tokens, in accordance with an embodiment.

FIG. 6 provides an example process for centrally managing access to payment tokens, in accordance with an embodiment. At 600, the merchant service provider tokenizes payment data. The payment data can be received by the merchant service provider from a first merchant as described above with respect to FIGS. 1-4. At 602, the merchant service provider can store the payment token. At 604, the merchant service provider can send payment token access data to the first merchant. Thus, unlike other embodiments discussed above, the first merchant does not receive a copy of the payment token directly, but instead receives access data, such as a key or transaction ID corresponding to the token, which can be used to retrieve a copy of the token from the merchant service provider if needed. At 606, the first merchant can send transaction details to a second merchant. As described above, the first merchant acts as a broker for goods or services offered by the second merchant. The transaction details sent to the second merchant can include the payment token access data. At 608, the second merchant can send a request to the merchant service provider to complete the transaction. This request can include the payment token access data and can specify whether the second merchant requests that the merchant service provider process the payment or return the actual payment details to the second merchant for further processing. This request can additionally include a request for the payment token, for use in future transactions. By centrally managing access to payment tokens at the merchant service provider, the likelihood of misuse of payment tokens, either accidental or malicious, is reduced.

FIG. 7 is a block diagram of an exemplary system for authorizing requests using payment tokens, in accordance with an embodiment. In the embodiment shown in FIG. 7, a second merchant 700 can send 702 the payment token to merchant service provider 704 to complete the transaction. As described above with respect to FIGS. 1 and 3, this can include having the merchant service provider 704 complete the transaction by submitting the pay mew data to a payment processing network 122, or receiving the payment data in return for the payment token so that the second merchant 704 can submit the payment data to their acquirer or payment processor. To reduce the risk of payment tokens being used in fraudulent transactions, the payment token can be verified and the request can be authorized.

In accordance with an embodiment, payment tokens can be associated with context information. The context information can include one or more of an expiration time/date for the token, merchant identifiers for the first and second merchants, and a transaction identifier. Additionally, trust relationships can exist between the merchants and between each merchant and the merchant service provider. Data describing the trust relationships can be stored by the merchant service provider in, for example, merchant/consumer data 142. When a request is received by the merchant service provider 704 from the second merchant 700 to complete a transaction using a payment token, a token request authorization module 706 can be used to authorize the request by comparing the context information associated with the payment token with the merchant/consumer data 142. For example, the token request authorization module 706 can determine whether the second merchant is "trusted" by merchant service provider 704 and that the payment token has not expired. If the second merchant is trusted and the payment token is not expired then the request can be authorized. Once the request is authorized, a token verification module 708 can compare 712 the payment token which accompanied the request to the payment token in token data 155. If the payment tokens match, then the payment data corresponding to the payment token can be retrieved. The payment data can then either be sent to a payment processor by the merchant service provider, as described above in FIG. 1, or returned to the second merchant 700 for processing, as described above in FIG. 3.

In accordance with an embodiment, additional authorization and verification methods may be used to determine that a particular transaction request using a payment token is valid. For example, if the second merchant does not have a preexisting relationship with the merchant service provider, and is not a trusted merchant, the merchant service provider can determine whether the second merchant is trusted by the first merchant. For example, a particular merchant can maintain a trusted merchant list with the merchant service provider which includes a plurality of second merchants with which the particular merchant regularly conducts business. If, for example, an online travel agent facilitates reservations with a particular group of hotels, each hotel in that group may be added to the online travel agent's trusted merchant list, maintained by the merchant service provider. This list can be updated accordingly as the members of the group change over time.

Figure 8:
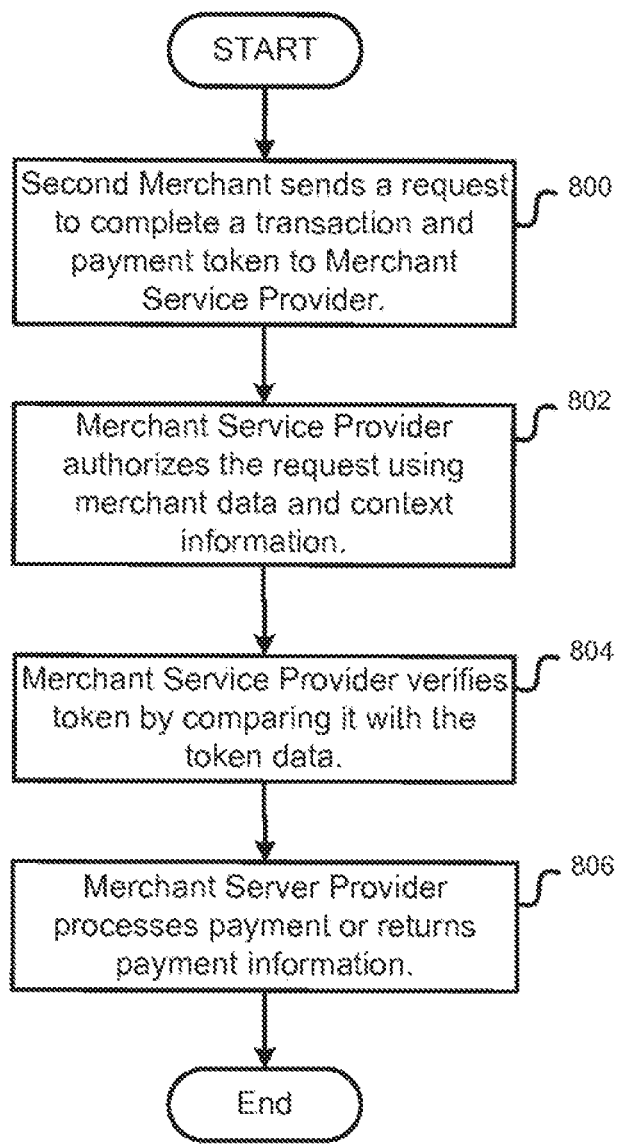
FIG. 8 provides an example process for authenticating a transaction request using a payment token, in accordance with an embodiment.

FIG. 8 provides an example process for authorizing a transaction request using a payment token, in accordance with an embodiment. As shown in FIG. 8, at 800 the second merchant sends a request in complete a transaction using a payment token to a merchant service provider. The request can include the payment token, context information associated with the payment token, and transaction details. The payment token can be sent to the merchant service provider with a request for the merchant service provider to retrieve the actual payment data associated with the payment token and complete the transaction by submitting the actual payment data and transaction details to a payment processing network. Alternative the request can be for the return of the actual payment data associated with the payment token, such that the second merchant can complete the transaction itself.

When the second merchant sends the payment token back to the merchant service provider to complete a transaction with a consumer (for example, step 230 in FIG. 2), the merchant service provider can authenticate the payment token and authorize the request. At 802, the merchant service provider can authenticate the request using merchant data and the context information. For example, the merchant service provider can determine whether a trusted relationship exists between the second merchant and the merchant service provider, or between the first merchant and the second merchant. Additionally, the merchant service provider can determine whether the token has expired based on the context information.

At 804, the merchant service provider verifies the payment token by comparing it with token data stored by the merchant service provider. This token data can include a copy of the token as originally created. Once the payment token is verified, the request can be completed. At 806, based on the request, the merchant service provider processes the transaction using the actual payment data corresponding to the payment token, or returns the actual payment data to the second merchant for processing.

Figure 9:
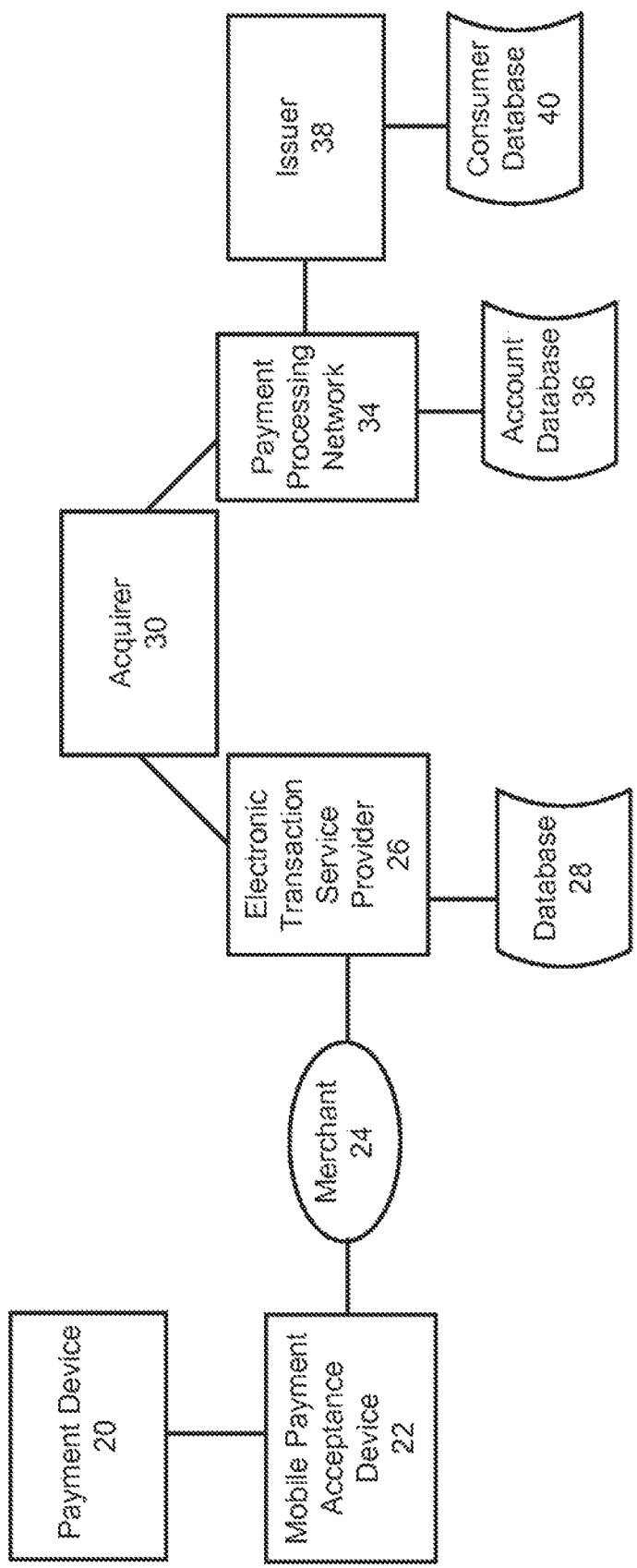
FIG. 9 is a block diagram illustrating a transaction processing system that may be used with some embodiments of the present invention.

FIG. 9 is a block diagram illustrating a transaction processing system 10 that may be used with some embodiments of the present invention. FIG. 9 illustrates the primary functional elements that are typically involved in processing a payment transaction and in the authorization process for such a transaction. As shown in FIG. 7, in a typical payment transaction a consumer wishing to purchase a good or service from a merchant uses a payment device 20 to provide payment transaction data that may be used as part of a consumer authentication or transaction authorization process. Payment device 20 may be a debit card, credit card, smart card, mobile device containing a contactless chip, computer, or other suitable form of device.

The portable payment device presented to a mobile payment acceptance device 22 of a merchant 24. For example, the acceptance device 22 could be a device reader or point of sale (POS) terminal 22 which is able to access data stored on or within the payment device. In embodiments, the portable payment device communicates account/payment data to the merchant 24 via a "card not present" transaction over a communications network, such as a cellular network, the Internet, etc. The account data (as well as any required consumer data) is communicated to the merchant 24 and ultimately to a merchant service provider 26 (such as AUTHORIZE.NET). As part of the authentication or authorization process performed by the merchant service provider, the merchant service provider 26 may access database 28, which typically stores data regarding the customer/consumer/user (as the result of a registration process with the merchant, for example), the consumer's payment device, and the consumer's transaction history with the merchant. The database 28 may also include information about the merchant 24, such as a list of the merchant's approved payment acceptance devices 22. For example, upon receiving information about the payment device 20 from the merchant's mobile payment acceptance device 22, the merchant service provider 26 may extract information that identifies the mobile payment acceptance device 22 and validate that information against a list of approved mobile payment acceptance devices. The merchant service provider 26 typically communicates with acquirer 30 (which manages the merchant's accounts) as part of the overall authentication or authorization process. The merchant service provider 26 and/or acquirer 30 provide data to payment processing network 34, which, among other functions, participates in the clearance and settlement processes that are part of the overall transection processing.

Communication and data transfer between merchant service provider 26 and payment processing network 34 are typically by means of an intermediary, such as acquirer 30. As part of the consumer authentication or transaction authorization process, payment processing network 34 may access account database 36, which typically contains information regarding the consumer's account payment history, chargeback or transaction dispute history, credit worthiness, etc. Payment processing network 34 communicates with issuer 38 as part of the authentication or authorization process, where issuer 38 is the entity that issued the payment device to the consumer and manages the consumer's account. Customer or consumer account data is typically stored in customer/consumer database 40 which may be accessed by Issuer 38 as part of the authentication, authorization or account management processes. Note that instead of, or in addition to, being stored in account database 36, consumer account data may be included in, or otherwise part of, customer/consumer database 40.

According to an embodiment, in standard operation, an authorization request message is created by the mobile payment acceptance device 22 during a consumer purchase of a good or service using a portable payment device. In some embodiments, the mobile payment acceptance device 22 of the merchant 24 may be a wireless phone or personal digital assistant that incorporates a contactless card or chip or payment acceptance application. The authorization request message is typically sent from the payment application of the mobile payment acceptance device 22 to the merchant service provider 26, and then to the merchant's acquirer 30, to a payment processing network 34, and then to an issuer 38. An authorization request message can include a request for authorization to conduct an electronic payment transaction and data relevant to determining if the request should be granted as well as device identification information related to the mobile payment acceptance device 22, which the merchant service provider validates against the list of approved mobile payment acceptance devices 22. For example, it may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent unauthorized access to account or transaction data.

After the Issuer receives the authorization request message, the Issuer determines if the transaction should be authorized and sends an authorization response message back to the payment processing network to indicate whether or not the current transaction is authorized. The payment processing system then forwards the authorization response message to the acquirer. The acquirer then sends the response message to the merchant service provider 26, which then sends the response message to the merchant's mobile payment acceptance device 22. The merchant is thus made aware of whether the Issuer has authorized the transaction, and hence whether the transaction can be completed.

At a later time, a clearance and settlement process may be conducted by elements of the payment/transaction processing system depicted in FIG. 2. A clearance process involves exchanging financial details between an Acquirer and an Issuer to facilitate posting a transaction to a consumer's account and reconciling the consumer's settlement position. Clearance and settlement can occur simultaneously or as separate processes.

Payment processing network 34 may include server computer. A server computer is typically a powerful computer or cluster of computers. For example, the server computer can be a large mainframe, a minicomputer cluster, or a group of servers functioning as a unit. In one example, the server computer may be a database server coupled to a web server. Payment processing network 34 may use any suitable combination of wired or wireless networks, including the Internet, to permit communication and data transfer between network elements. Among other functions, payment processing network 34 may be responsible for ensuring that consumer is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

The payment device 20 may take one of many suitable forms. As mentioned above, the portable payment device can be a mobile device that incorporates a contactless element such as a chip for storing payment data (e.g., a BIN number, account number, etc.) and a near field communications (NF) data transfer element such as an antenna, a light emitting diode, a laser, etc. The portable payment device may also include a keychain device (such as the Speedpass™ commercially available from Exxon-Mobil Corp.), etc. The device containing the contactless card or chip, or other data storage element may be a cellular (mobile) phone, personal digital assistant (PDA), pager, transponder, or the like. The portable payment device may also incorporate the ability to perform debit functions (e.g., a debit card), credit functions (e.g. a credit card), or stored value functions (e.g., a stored value or prepaid card).

Figure 10:
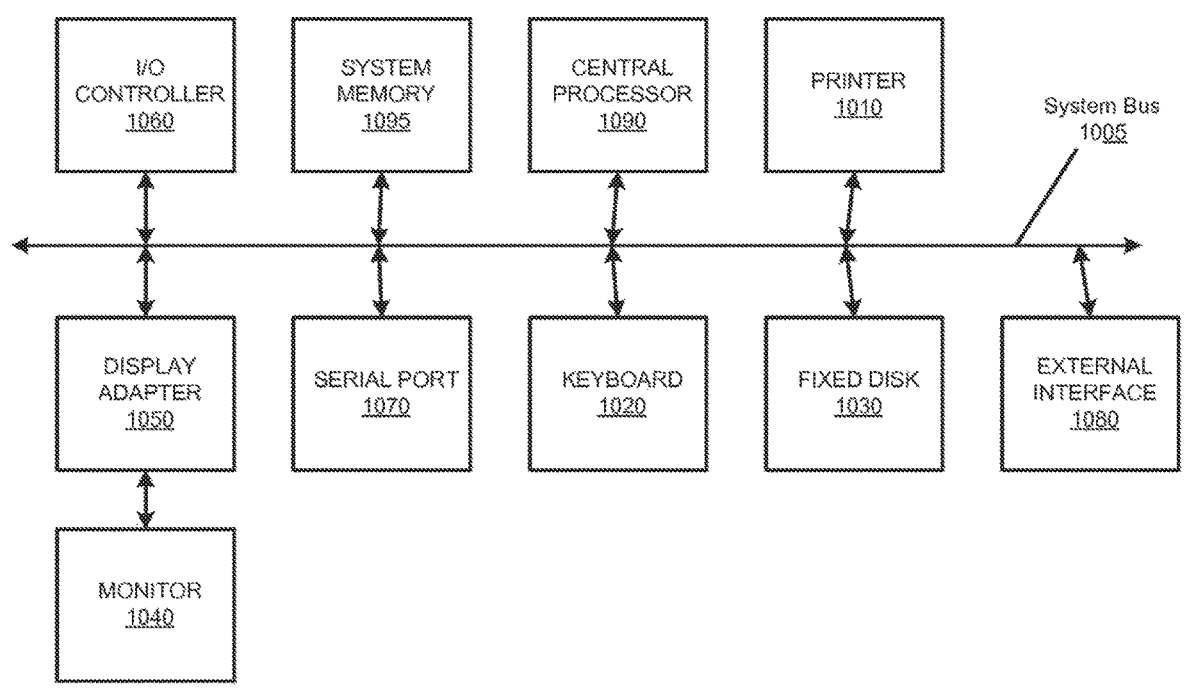
FIG. 10 illustrates an exemplary computer system in which various embodiments can be implemented.

FIG. 10 shows a block diagram of an exemplary computer apparatus that can be used in some embodiments of the invention (e.g., in any of the components shown in the prior Figures). The subsystems shown in FIG. 10 are interconnected via a system bus 1005. Additional subsystems such as a printer 1010, keyboard 1020, fixed disk 1030 (or other memory comprising computer-readable media), monitor 1040, which is coupled to display adapter 1050, and others are shown. Peripherals and input/output (I/O) devices, which couple to I/O controller 1060, can be connected to the computer system by any number of means known in the art, such as through serial port 1070. For example, serial port 1070 or external interface 1080 can be used to connect the computer apparatus to a wide area network such as the Internet, a mouse input device, or a scanner. The interconnection via system bus 1005 allows the central processor 1090 to communicate with each subsystem and to control the execution of instructions from system memory 1095 or the fixed disk 1030 as well as the exchange of information between subsystems. The system memory 1095 and/or the fixed disk 1030 may embody a computer-readable medium.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein. For example, although some specific embodiments describe the use of a message conversion process with typical brick and mortar type merchants, embodiments of the invention can also be used in on-line e-commerce type transactions.

Embodiments of the invention are not limited to the above-described embodiments. For example, although separate functional blocks are shown for an issuer, payment processing system, and acquirer, some entities perform all of these functions and may be included in embodiments of invention.

Further, additional embodiments of the invention may be directed to methods and systems involving merchants, and their access devices, as well as issues. For example, other embodiments may include the following additional embodiments.

It should be understood that the present invention as described above can be implemented form of control logic using computer software in a modular or integrated manner. Based on the disclosure and teachings provided herein, a person of ordinary skill in the art can know and appreciate other ways and/or methods to implement the present invention using hardware and a combination of hardware and software.

Any of the software components or functions described in this application, may be implemented as software code to be executed by a processor using suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CDROM. Any such computer-readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", as specifically indicated to the contrary.

All patents, patent applications, publications, and descriptions mentioned above are herein incorporated by reference in their entirety for all purposes. None is admitted to be prior art.

What is claimed is:

1. A method for tokenizing payment data received from a computer of a consumer, the method comprising:
   receiving, at a merchant service provider computer, order information from a computer of a first entity for a transaction to be fulfilled by a second entity;
   in response to receiving the order information, receiving, at the merchant service provider computer, the payment data from the computer of the consumer, the payment data associated with the transaction initiated between the computer of the consumer and the computer of the first entity, wherein the payment data is received at the merchant service provider computer from the consumer through an interaction between the consumer and a webpage of the first entity, wherein the payment data includes an actual payment account;
   generating, at the merchant service provider computer, a payment token and payment token access data associated with the payment token, wherein the payment token is anonymized payment data;
   storing, by the merchant service provider computer, the payment token and the payment token access data;
   transmitting, from the merchant service provider computer, the payment token access data to the first entity, wherein the first entity provides the payment token access data to the second entity;
   in response to transmitting the payment token access data to the first entity, receiving, at the merchant service provider computer from a computer of the second entity, a request to complete the transaction initiated between the computer of the consumer and the computer of the first entity, the request including the payment token access data;
   in response to receiving the request:
      retrieving, at the merchant service provider computer, the payment token and the payment data using the payment token access data; and
      performing at least one of the following:
         processing, by the merchant service provider computer, the transaction using the payment data; or
         transmitting, by the merchant service provider computer, at least one of the payment data or the payment token to the computer of the second entity for processing the transaction.

2. The method of claim 1, further comprising:
   transmitting the payment data and the order information associated with the transaction initiated between the computer of the consumer and the computer of the first entity to a payment processing computer for processing on behalf of the second entity.

3. The method of claim 1 wherein the request to complete the transaction includes a request for the merchant service provider computer to process the transaction on behalf of the second entity.

4. The method of claim 1 wherein the request to complete the transaction includes a request to return the payment data corresponding to the payment token to the second entity.

5. The method of claim 1 wherein the merchant service provider computer is a hosted order page (HOP) service provider computer and the payment data is received through a HOP.

6. The method of claim 1 wherein the merchant service provider computer is a silent order post (SOP) service provider computer and the payment data is received through a SOP.

7. The method of claim 1, further comprising:
   receiving, at the merchant service provider computer from the computer of the second entity, an authorization request message including the payment token;
   determining, by the merchant service provider computer, that a trust relationship exists between merchant service provider and the second entity or between the first entity and the second entity; and
   transmitting, by the merchant service provider computer to the computer of the second entity, an authorization response message authorizing the transaction based on determining the trust relationship.

8. A system, comprising:
   a merchant service provider computer, including an electronic processor and a memory coupled to the electronic processor storing instructions that when executed by the electronic processor causes the electronic processor to perform operations of:
      receiving order information from a computer of a first entity for a transaction to be fulfilled by a second entity;
      in response to receiving the order information, receiving a payment data from a computer of a consumer, the payment data associated with the transaction initiated between the computer of the consumer and the computer of the first entity, wherein the payment data is received from the consumer through an interaction between the consumer and a webpage of the first entity, wherein the payment data includes an actual payment account;
      generating a payment token and payment token access data associated with the payment token, wherein the payment token is anonymized payment data;
      storing, by the merchant service provider computer, the payment token and the payment token access data;
      transmitting, from the merchant service provider computer, the payment token access data to the first entity, wherein the first entity provides the payment token to the second entity;
      in response to transmitting the payment token access data to the first entity, receiving, at the merchant service provider computer from a computer of the second entity, a request to complete the transaction initiated between the computer of the consumer and the computer of the first entity, the request including the payment token access data;

in response to receiving the request:
retrieving, at the merchant service provider computer, the payment token and the payment data using the payment token access data; and
performing at least one of the following:
processing, by the merchant service provider computer, the transaction using the payment data; or
transmitting, by the merchant service provider computer, at least one of the payment data or the payment token to the computer of the second entity for processing the transaction.

9. The system of claim 8, wherein the operations further includes: transmitting the payment data and the order information associated with the transaction initiated between the computer of the consumer and the computer of the first entity to a payment processing computer for processing on behalf of the second entity.

10. The system of claim 8 wherein the request to complete the transaction includes a request for the merchant service provider computer to process the transaction on behalf of the second entity.

11. The system of claim 8 wherein the request to complete the transaction includes a request to return the payment data corresponding to the payment token to the second entity.

12. The system of claim 8 wherein the merchant service provider computer is a hosted order page (HOP) service provider computer and the payment data is received through a HOP.

13. The system of claim 8 wherein the merchant service provider computer is a silent order post (SOP) service provider computer and the payment data is received through a SOP.

14. The system of claim 8, wherein the operations further includes: receiving, from the computer of the second entity, an authorization request message including the payment token; determining that a trust relationship exists between merchant service provider and the second entity or between the first entity and the second entity; and transmitting, to the computer of the second entity, an authorization response message authorizing the transaction based on determining the trust relationship.

* * * * *